(12) United States Patent
Scherer et al.

US007728093B2

(10) Patent No.: US 7,728,093 B2
(45) Date of Patent: Jun. 1, 2010

(54) COPOLYMERS AS DEWAXING ADDITIVES

(75) Inventors: Markus Scherer, Lebach (DE); Michael Mueller, Bensheim (DE); Jean-Luc Herbeaux, Singapore (SG); Dieter Janssen, Gross-Umstadt (DE); Melanie Croessmann, Ober-Ramdstadt (DE)

(73) Assignee: Evonik Rohmax Additives GmbH, Darmstadt (DE)

( * ) Notice: Subject to any disclaimer, the term of this patent is extended or adjusted under 35 U.S.C. 154(b) by 346 days.

(21) Appl. No.: 10/505,370

(22) PCT Filed: Feb. 14, 2003

(86) PCT No.: PCT/EP03/01472

§ 371 (c)(1),
(2), (4) Date: Aug. 23, 2004

(87) PCT Pub. No.: WO03/074578

PCT Pub. Date: Sep. 12, 2003

(65) Prior Publication Data

US 2005/0148749 A1 Jul. 7, 2005

(30) Foreign Application Priority Data

Mar. 1, 2002 (DE) ................. 102 08 799

(51) Int. Cl.
C08F 118/02 (2006.01)
C10G 73/06 (2006.01)
(52) U.S. Cl. .................... 526/319; 526/346; 208/33
(58) Field of Classification Search ............ 526/319, 526/346; 525/166; 208/33
See application file for complete search history.

(56) References Cited

U.S. PATENT DOCUMENTS

| 4,758,365 | A | * | 7/1988 | Neunier et al. ............ 508/306 |
| 5,098,550 | A | * | 3/1992 | Mueller et al. ............. 208/37 |
| 2005/0148749 | A1 | | 7/2005 | Scherer et al. |
| 2005/0239937 | A1 | | 10/2005 | Scherer et al. |
| 2005/0245406 | A1 | | 11/2005 | Scherer et al. |
| 2005/0261143 | A1 | | 11/2005 | Scherer et al. |
| 2005/0267239 | A1 | | 12/2005 | Scherer |
| 2006/0189490 | A1 | | 8/2006 | Dardin et al. |
| 2006/0240999 | A1 | | 10/2006 | Placek et al. |

FOREIGN PATENT DOCUMENTS

| EP | 0 682 046 | | 11/1995 |
| EP | 682046 | A1 * | 11/1995 |
| EP | 1 086 964 | | 3/2001 |
| EP | 1086964 | A2 * | 3/2001 |
| GB | 906 412 | | 9/1962 |
| GB | 906412 | * | 9/1962 |
| GB | 2 160 536 | | 12/1985 |

OTHER PUBLICATIONS

U.S. Appl. No. 10/592,363, filed Sep. 11, 2006, Scherer et al.
U.S. Appl. No. 10/593,082, filed Sep. 15, 2006, Scherer et al.
U.S. Appl. No. 11/547,612, filed Oct. 4, 2006, Scherer et al.
U.S. Appl. No. 11/572,181, filed Jan. 16, 2007, Scherer et al.
U.S. Appl. No. 11/572,330, filed Jan. 19, 2007, Acker et al.
U.S. Appl. No. 11/995,949, filed Jan. 17, 2007, Stoehr et al.
U.S. Appl. No. 11/815,624, filed Aug. 6, 2007, Mueller et al.
U.S. Appl. No. 11/909,171, filed Sep. 20, 2007, Stoehr et al.
U.S. Appl. No. 10/505,370, filed Aug. 23, 2004, Patent App. Publication No. US2005/0148749, Scherer, et al.
U.S. Appl. No. 10/526,435, filed Mar. 3, 2005, Patent App. Publication No. US2005/0261143, Scherer, et al.
U.S. Appl. No. 10/525,529, filed Feb. 24, 2005, Patent App. Publication No. US2005/0267239, Scherer.
U.S. Appl. No. 10/525,942, filed Feb. 28, 2005, Patent App. Publication No. US2005/0239937, Scherer, et al.
U.S. Appl. No. 10/550,764, filed Sep. 27, 2005, Patent App. Publication No. US2006/0189490, Dardin, et.
U.S. Appl. No. 10/834,861, filed Apr. 30, 2004, Patent App. Publication No. US2005/0245406, Scherer, et al.
U.S. Appl. No. 11/587,988, filed Oct. 30, 2006, Fischer, et al.

* cited by examiner

*Primary Examiner*—David Wu
*Assistant Examiner*—Michael M Bernshteyn
(74) *Attorney, Agent, or Firm*—Oblon, Spivak, McClelland, Maier & Neustadt, L.L.P.

(57) ABSTRACT

The invention relates to copolymers which are suitable for producing additives for solvent deparaffination of paraffin-containing mineral oil distillates and which consist of radically polymerized monomers of formulas A and B, wherein the radicals have the meaning cited in the description. The invention also relates to the use of said copolymers for the production of dewaxing additives.

20 Claims, No Drawings

COPOLYMERS AS DEWAXING ADDITIVES

FIELD OF THE INVENTION

The invention relates to copolymers or polymer mixtures which are suitable for preparing additives for solvent deparaffinization of paraffinic mineral oil distillates, to dewaxing additives prepared therefrom and also to their use in the solvent deparaffinization of paraffinic mineral oil distillates.

PRIOR ART

U.S. Pat. No. 4,451,353 describes mixtures of a poly-$C_{10}$-$C_{28}$-alkyl acrylate and a poly-n-alkyl methacrylate ($C_{10}$-$C_{20}$) as dewaxing additives. However, reference is made to the exclusive use of linear polyalkyl methacrylates as mixing components.

DE-A-3933376 demonstrated that when polyalkyl methacrylate mixing components having high degrees of branching of the alkyl radicals are used, improved effectiveness and more marked synergistic effects occur than in linear systems.

Tanasescu et al. (Rev. Chim. (Bucharest) 1998, 49(9), 593-597) mentioned the evaluation of copolymers of $C_{10\text{-}18}$, methacrylates and styrene as dewaxing aids in methyl ethyl ketone/toluene mixtures. However, reference is made to the worsened effectiveness of the styrenic polymers in comparison to the purely methacrylate-based additives and this is explained by a "dilution effect" with regard to the effective alkyl side groups. Polymers having side chains $>C_{18}$, i.e. behenyl(meth)-acrylates among others, are not mentioned.

OBJECT AND SOLUTION

It is an object of the present invention to provide copolymers or polymers having improved effectiveness in the solvent deparaffinization of paraffinic mineral oil distillates, in particular when used in different feedstocks and using different solvent systems. In particular, the more effective dewaxing aids should be provided very substantially on the basis of existing starting materials which should cause no substantial changes in the performance of the deparaffinization technology of crude oils or crude oil products.

This object and further objects that are not specified explicitly are achieved by copolymers which consist of free-radically polymerized monomers of the following formulae A and B:

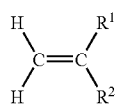

Formula A where
$R^1$=H or $CH_3$,
$R^2$=phenyl, benzyl, naphthyl, anthranyl, phenanthryl, N-pyrrolidonyl, N-imidazolyl, 2-pyridyl, 4-pyridyl or an alkyl-substituted aromatic substituent or
$R^2$=$COOR^3$ where $R^3$=H or $R^3$ is a linear or branched alkyl radical of $C_1$-$C_{10}$
or $R^3$ is a heteroatom-substituted radical —$(CH_2)_nX$ where X=OH or X=$N(R^4)_2$ where n=1-10 and $R^4$ is in each case independently H or $R^4$=$C_1$-$C_4$-alkyl
or $R^3$ is —$(CH_2CH_2O)_mR^5$ where m=1-90 and $R^5$=H or $R^5$=$C_1$-$C_{18}$-alkyl or $R^3$ is a benzyl, phenyl or cyclohexyl radical or $R^2$=$CONHR^6$ where $R^6$=H or $R^6$ is a linear or branched alkyl radical of $C_1$-$C_{10}$ or $R^6$ is a heteroatom-substituted radical —$(CH_2)_nX$ where X=OH or X=$N(R^4)_2$ where n=1-10 and $R^4$ is in each case independently H or $R^4$=$C_1$-$C_4$-alkyl;

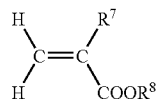

Formula B where $R^7$=H or $CH_3$
and the $R^8$ radical =H or linear or branched alkyl radicals of $C_{12}$-$C_{40}$.

Further solutions which are likewise suitable and also suitable uses of the copolymers or polymers according to the invention are described in the subclaims.

IMPLEMENTATION

The monomers of the formula A:

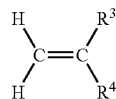

where
$R^3$=H or $CH_3$,
$R^2$ phenyl, benzyl, naphthyl, anthranyl, phenanthryl, N-pyrrolidonyl, N-imidazolyl, 2-pyridyl, 4-pyridyl or an alkyl-substituted aromatic substituent or
$R^2$=$COOR^3$ where $R^3$=H or $R^3$ is a linear or branched alkyl radical of $C_1$-$C_{10}$
or $R^3$ is a heteroatom-substituted radical —$(CH_2)_nX$ where X=OH or X=$N(R^4)_2$ where n=1-10 and $R^4$ is in each case independently H or $R^4$=$C_1$-$C_4$-alkyl
or $R^3$ is —$(CH_2CH_2O)_mR^5$ where m=1-90 and $R^5$=H or $R^5$=$C_1$-$C_{18}$-alkyl or $R^3$ is a benzyl, phenyl or cyclohexyl radical
or $R^2$=$CONHR^6$ where $R^6$=H or $R^6$ is a linear or branched alkyl radical of $C_1$-$C_{10}$
or R is a heteroatom-substituted radical —$(CH_2)_nX$ where X=OH or X=$N(R^4)_2$, n=1-10 and $R^4$ is in each case independently H or $R^4$=$C_1$-$C_4$-alkyl are, for example, styrene, alpha-methylstyrene, alpha- or beta-vinylnaphthalene, alpha- or beta-vinylphenanthrene, N-vinylpyrrolidone, 2- or 4-vinylpyridine or their, for example alkyl-substituted, derivatives.

The compositions from which the (co)polymers according to the invention are obtained comprise in particular (meth)acrylates, maleates and/or fumarates which have different alcohol radicals. The term (meth)acrylates encompasses methacrylates and acrylates and also mixtures of both. These monomers are well known. The alkyl radical may be linear, cyclic or branched.

Examples include (meth)acrylates, fumarates and maleates which are derived from saturated alcohols, such as methyl (meth)acrylate, ethyl(meth)acrylate, n-propyl(meth)acrylate, isopropyl(meth)acrylate, n-butyl(meth)acrylate, tert-butyl (meth)acrylate and pentyl(meth)acrylate;

cycloalkyl(meth)acrylates, such as cyclopentyl(meth) acrylate;

(meth)acrylates which are derived from unsaturated alcohols, such as 2-propynyl(meth)acrylate, allyl (meth)acrylate and vinyl(meth)acrylate.

Further constituents which may be present in the compositions to be polymerized include: (meth)acrylates, fumarates and maleates which are derived from saturated alcohols, such as hexyl(meth)acrylate, 2-ethylhexyl(meth)acrylate, heptyl (meth)acrylate, 2-tert-butylheptyl(meth)acrylate, octyl (meth)acrylate, 3-isopropylheptyl(meth)acrylate, nonyl (meth)acrylate, decyl(meth)acrylate, undecyl(meth)acrylate, 5-methylundecyl(meth)acrylate, dodecyl (meth)acrylate, 2-methyldodecyl(meth)acrylate, tridecyl (meth)acrylate, 5-methyltridecyl(meth)acrylate, tetradecyl(meth)acrylate, pentadecyl(meth)acrylate;

(meth)acrylates which are derived from unsaturated alcohols, e.g. oleyl(meth)acrylate;

cycloalkyl(meth)acrylates such as 3-vinylcyclohexyl (meth)acrylate, cyclohexyl(meth)acrylate, bornyl (meth) acrylate; and also the corresponding fumarates and maleates.

Examples of further components include (meth)acrylates which are derived from saturated alcohols such as hexadecyl (meth)acrylate, 2-methylhexadecyl(meth)acrylate, heptadecyl(meth)acrylate, 5-isopropyl-heptadecyl (meth)acrylate, 4-tert-butyloctadecyl (meth)acrylate, 5-ethyloctadecyl (meth)acrylate, 3-isopropyloctadecyl (meth)acrylate, octadecyl(meth)acrylate, nonadecyl(meth)acrylate, eicosyl(meth) acrylate, cetyleicosyl(meth)acrylate, stearyleicosyl (meth) acrylate, docosyl(meth)acrylate and/or eicosyltetratriacontyl (meth)acrylate;

cycloalkyl(meth)acrylates such as 2,4,5-tri-t-butyl-3-vinylcyclohexyl(meth)acrylate, 2,3,4,5-tetra-t-butylcyclohexyl (meth)acrylate; oxiranyl methacrylates such as 10,11-epoxyhexadecyl methacrylate; and also the corresponding fumarates and maleates.

Longer-chain (meth)acrylates are formed, for example, from acrylic esters of C10-C40-alkanols or of acrylic esters of C18-C24-alkanols, for example of the behenyl alcohol type.

Particular emphasis is given to esters of (meth)acrylic acid with alkanols having $C_{12}$-$C_{18}$-hydrocarbon radicals, for example having an average carbon number of 14, for example mixtures of DOBANOL® 25L (product of Shell AG) and tallow fatty alcohol, and also mixtures of tallow fatty alcohol and other alcohols, for example i-decyl alcohol.

The ester compounds having a long-chain alcohol radical can be obtained, for example, by reacting (meth)acrylates, fumarates, maleates and/or the corresponding acids with long-chain fatty alcohols, which generally results in a mixture of esters, for example (meth)acrylates having alcohol radicals of different chain lengths. Among others, these fatty alcohols include Oxo Alcohol® 7911 and Oxo Alcohol® 7900, Oxo Alcohol® 1100 from Monsanto; Alphanol® 79 from ICI; Nafol® 1620, Alfol® 610 and Alfol® 810 from Condea; Epal® 610 and Epal® 810 from Ethyl Corporation; Linevol® 79, Linevol® 911 and Dobanol® 25L from Shell AG; Lial 125 from Augusta® Milan; Dehydad® and Lorol® from Henkel KGaA and also Linopol® 7-11 and Acropol® 91 Ugine Kuhlmann.

Among the ethylenically unsaturated ester compounds, particular preference is given to the (meth)acrylates over the maleates and fumarates.

Components which are likewise suitable include hydroxyalkyl(meth)acrylates such as 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol (meth)acrylate, 1,10-decanediol (meth)acrylate; aminoalkyl(meth)acrylates such as N-(3-dimethylaminopropyl)methacrylamide, 3-diethylaminopentyl methacrylate, 3-dibutylaminohexadecyl(meth) acrylate;

nitriles of (meth)acrylic acid and other nitrogen-containing methacrylates such as N-(methacryloyloxyethyl)diisobutylketimine, N-(methacryloyloxyethyl)dihexadecylketimine, methacryloylamidoacetonitrile, 2-methacryloyloxyethylmethylcyanamide, cyanomethyl methacrylate;

aryl(meth)acrylates such as benzyl methacrylate or phenyl methacrylate where the aryl radicals may each be unsubstituted or up to tetrasubstituted;

carbonyl-containing methacrylates such as 2-carboxyethyl methacrylate, carboxymethyl methacrylate, oxazolidinylethyl methacrylate, N-(methacryloyloxy)formamide, acetonyl methacrylate, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone, N-(2-methacryloyloxypentadecyl)-2-pyrrolidinone, N-(3-methacryloyloxyheptadecyl)-2-pyrrolidinone;

glycol dimethacrylates such as 1,4-butanediol methacrylate, 2-butoxyethyl methacrylate, 2-ethoxyethoxymethyl methacrylate, 2-ethoxyethyl methacrylate;

methacrylates of ether alcohols, such as tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxymethyl methacrylate, ethoxymethyl methacrylate, methacrylates of halogenated alcohols such as 2,3-dibromopropyl methacrylate, 4-bromophenyl methacrylate, 1,3-dichloro-2-propyl methacrylate, 2-bromoethyl methacrylate, 2-iodoethyl methacrylate, chloromethyl methacrylate;

oxiranyl methacrylates such as 2,3-epoxybutyl methacrylate, 3,4-epoxybutyl methacrylate, 10,11-epoxyundecyl methacrylate, 2,3-epoxycyclohexyl methacrylate; glycidyl methacrylate;

phosphorus-, boron- and/or silicon-containing methacrylates such as 2-(dimethylphosphato)propyl methacrylate, 2-(ethylenephosphito)propyl methacrylate, dimethylphosphinomethyl methacrylate, dimethylphosphonoethyl methacrylate, diethylmethacryloyl phosphonate, dipropylmethacryloyl phosphate, 2-(dibutylphosphono)ethyl methacrylate, 2,3-butylenemethacryloylethyl borate, methyldiethoxymethacryloylethoxysilane, diethylphosphatoethyl methacrylate;

sulphur-containing methacrylates such as ethylsulphinylethyl methacrylate, 4-thiocyanatobutyl methacrylate, ethylsulphonylethyl methacrylate, thiocyanatomethyl methacrylate, methylsulphinylmethyl methacrylate, bis (methacryloyloxyethyl)sulphide;

trimethacrylates such as trimethyloylpropane trimethacrylate;

vinyl halides, for example vinyl chloride, vinyl fluoride, vinylidene chloride and vinylidene fluoride;

heterocyclic (meth)acrylates such as 2-(1-imidazolyl)ethyl (meth)acrylate, 2-(4-morpholinyl)ethyl(meth)acrylate and 1-(2-methacryloyloxyethyl)-2-pyrrolidone;

vinyl esters such as vinyl acetate;

styrene, substituted styrenes having an alkyl substituent in the side chain, for example α-methylstyrene and α-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes;

heterocyclic vinyl compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazol-es and hydrogenated vinylthiazoles, vinyloxazoles and hydrogenated vinyloxazoles;

vinyl and isoprenyl ethers;

maleic acid and maleic acid derivatives, for example mono- and diesters of maleic acid, maleic anhydride, methylmaleic anhydride, maleimide, methylmaleimide;

fumaric acid and fumaric acid derivatives, for example mono- and diesters of fumaric acid;

dienes, for example divinylbenzene.

Very particularly preferred mixtures comprise methyl methacrylate, butyl methacrylate, lauryl methacrylate, stearyl methacrylate and/or styrene.

These components may be used individually or as mixtures.

The components of the formula B:

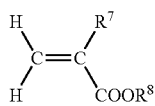

where $R^7$=H or $CH_3$ and the $R^6$ radical =H or linear or branched alkyl radicals of $C_{12}$-$C_{40}$, preferably alkyl radicals of chain length $C_{16}$-$C_{32}$ and in particular alkyl radicals of chain length $C_{18}$-$C_{24}$, are relatively long-chain (meth)acrylates known per se, as already described hereinabove.

They are composed, for example, of (meth)acrylic esters of $C_{12}$-$C_{40}$-alkanols or of (meth)acrylic esters of $C_{16}$-$C_{32}$-alkanols or of $C_1$-$C_{24}$-alkanols, for example of the behenyl alcohol type.

Mention is also made of esters of (meth)acrylic acid with alkanols having $C_{12}$-$C_{18}$-hydrocarbon radicals, for example having an average carbon number of 14, for example mixtures of DOBANOL® 25L (product from Shell AG) and tallow fatty alcohol, and also mixtures of tallow fatty alcohol and other alcohols, for example i-decyl alcohol.

The polymerization of the monomers may likewise be carried out in a manner known per se.

Advantageously, the free-radical polymerization is carried out in a solvent compatible with the substrate to be deparaffinized, for example in mineral oil. Customary polymerization initiators are used, for example peroxy compounds, in particular peresters, e.g. tert-butyl perpivalate, tert-butyl peroctanoate, tertbutyl perbenzoate, among others, in the customary amounts, for example 0.1 to 5% by weight, preferably 0.3 to 1% by weight, based on the monomers (cf. Th. Völker, H. Rauch-Puntigam, Acryl- und Methacryl-verbindungen, Springer-Verlag 1967).

Likewise in a manner known per se, molecular weight regulators may be added to the mixtures, in particular mercaptans, e.g. dodecylmercaptan, in the customary amounts, for example 0.01 to 2% by weight, based on the monomers.

Advantageously, operation is effected under a protective gas, for example $CO_2$, nitrogen or argon.

An advantageous procedure is to dissolve the monomers in the solvent in a suitable polymerization vessel equipped with a stirrer, optionally together with regulator and initiator and to initially degas, for example by means of $CO_2$ snow, and then to heat.

A starting point may be, for example, 80° C.±10° C. The initiator may also in some cases be added to the heated mixture. Optionally, further monomer and initiator and also regulator are metered in. The temperature generally rises further, for example to 140° C.±10° C. Optionally, conditions suitable for the continued polymerization may be obtained by introducing heat and/or adding further initiator. The overall polymerization time is generally below 12 hours.

In an advantageous embodiment, the (co)polymers according to the invention comprise a proportion by weight of monomer A in the total weight of the copolymer of 0.1-70%, preferably 0.5-50% and more preferably 5-30%.

The monomer A may advantageously consist of one or more of the monomers styrene, butyl methacrylate, methyl methacrylate or 2-ethylhexyl methacrylate.

In a likewise advantageous embodiment, at least 50% of the monomers B contain alkyl radicals $R^8$ of chain length greater than or equal to $C_{16}$.

In addition to one or more of the copolymers previously described, the polymer mixture according to the invention may also comprise one or more further homo- or copolymers which are polyalkyl methacrylates and have alkyl substituents of chain length $C_1$-$C_{24}$ or of chain length $C_{12}$-$C_{18}$. The compounds already described may be used for this purpose.

In this polymer mixture, the ratio of the copolymers and the further homo- or copolymers is advantageously 1:20 to 20:1, preferably 1:10 to 10:1 and more preferably 1:5 to 5:1.

In an advantageous embodiment, any further homo- or copolymer contained in the polymer mixture is a polyalkyl methacrylate which contains up to 20% by weight of $C_1$-$C_{10}$-methacrylates.

The molecular weight of the copolymers or polymers used is between 10,000 and 3,000,000 g/mol, between 100,000 and 1,500,000 g/mol, between 150,000 and 800,000 g/mol or between 200,000 and 500,000 g/mol.

The determination of the molecular weight may be carried out by means of gel permeation chromatography (cf. Kirk-Othmer, Encyclopedia of Chemical Technology, 3rd Ed., Vol. 18, pg. 209, 749, J. Wiley 1982).

The polymer components may be prepared in a manner known per se in a batch process by introducing all of the monomers used into the initial-charge, or in a feed process. The preparation may also be effected in a feed process by synthesizing at least one of the polymers of the polymer mixture using an increased concentration of at least one of the monomers used in the initial monomer charge in comparison to the other monomer types used with the aim of preparing a polymer mixture in which different polymers are present with regard to the monomer composition.

The copolymers or polymer mixtures according to the present invention serve to prepare dewaxing additives, optionally with the addition of further customary additives for dewaxing additives.

In particular, the dewaxing additives may be a solution of the copolymers or of the polymer mixture in an oil of the paraffinic or naphthenic type or else in an organic solvent.

In this case, the organic solvent in a preferred embodiment is toluene, xylene and/or naphtha.

With regard to the wax-containing substrates based on crude oil and suitable for deparaffinization, no definite limits to the process can be recognized, although, from a practical standpoint, useful substrates are in particular wax-containing distillate oils, in particular those having a boiling range of approx. 300 to approx. 600° C., a density of approx. 0.08-0.09 g/cc at 15° C., a viscosity of approx. 10-20 cSt/100° C., a pour point of approx. 30-50° C. and a wax content (dry) of from approx. 10 to approx. 25% by weight.

Particular importance attaches to distillate oils of those fractions which include lubricants and speciality oils in the 300-600° C. boiling range, in particular those having an average boiling point of approx. 400-450° C.

The solvents used for solvent deparaffinization according to the invention likewise correspond to those used customarily. These are, for example:

aliphatic hydrocarbons having a boiling point <150° C. at atmospheric pressure, and among these the self-cooling gases such as propane, propylene, butane, pentane and also isooctane, aromatic hydrocarbons, for example toluene and xylene, ketones, for example acetone, dimethyl ketone, methyl ethyl ketone, methyl propyl ketone, methyl isobutyl ketone, optionally also halogenated hydrocarbons such as methylene chloride or dichloroethane, or N-alkylpyrrolidones such as N-methylpyrrolidone or N-ethylpyrrolidone.

Mixtures of solvents are also advantageous, for example of ketones and aromatic hydrocarbons such as methyl ethyl ketone/toluene or methyl isobutyl ketone/toluene.

The solvent S in the process according to the invention is added in the customary amounts, for example 0.5-10 parts by volume, preferably 2-7 parts by volume, based on the substrate to be deparaffinized.

When a dewaxing additive is used for solvent deparaffinization of paraffinic mineral oil distillates, the addition rate of the copolymer or of the polymer mixture in the dewaxing process is 0.005-0.5% ppm, in particular 0.01-0.3% ppm or 0.05-0.18% ppm.

Unexpectedly, it has been found that copolymers of alkyl acrylates, in particular behenyl acrylate ($=C_{18-24}$), and styrene are more effective dewaxing aids than corresponding styrene-free polymers in different feedstocks and using different solvent systems. The latter systems are the state of the art. This is true both for the comparison between individual components, i.e. poly-behenyl acrylate-co-styrene with poly-behenyl acrylate, and for the comparison between styrenic and styrene-free mixed components. A polybehenyl-co-styrene/polymethacrylate mixed system is thus more effective than a polybehenyl/polymethacrylate mixture. Improvements in comparison with the existing mixed components are revealed in comparisons with mixed systems comprising linear polyalkyl methacrylates as described in U.S. Pat. No. 4,451,353 but also in the comparison with mixed systems comprising branched polyalkyl methacrylates.

It has likewise been found that the incorporation of other monomers in addition to styrene into copolymers with behenyl acrylate also leads to novel dewaxing additives which, just as unexpectedly as the styrene systems, lead to improved dewaxing results in comparison to the prior art. For example, copolymers composed of behenyl acrylate and either n-butyl methacrylate, isononyl methacrylate or benzyl methacrylate were better in every respect than polybehenyl acrylate polymers.

The statements made are manifested in the examples described hereinbelow, in particular with the aid of the filtration rates measured.

Example 9 shows that a mixture of the styrene/behenyl acrylate copolymer P1 with the polymethacrylate P7 (P7 as a $C_{12}$-$C_{18}$-polymethacrylate having linear side chains) in a 600N feedstock of a European refinery facilitated shorter filtration times in comparison with the mixture of the styrene-free analogue C1 with polymer P7. Equally, a mixture of P1 and P8 (P8 is a $C_{12}$-$C_{18}$ polymethacrylate having more significantly branched side chains than P7) in this feedstock was distinctly better than the mixture of the styrene-free C1 with P8 corresponding to the prior art. A further example which demonstrates the improved effectiveness of a styrenic additive is provided by a mixture of P1 and the $C_{16}$-$C_{18}$ polymethacrylate P6 in comparison to the comparative sample consisting of a mixture of C1 and P6, likewise in European 600N feedstock. Equally, it can be clearly recognized in Example 11 that the individual component P1 also provided shorter filtration times in comparison to the comparative sample C1.

The finding obtained on styrenic systems was additionally substantiated with the aid of investigations in two alternative feedstocks (see Examples 10 and 11). Dewaxing studies carried out in n-heptane in a 500N feedstock of a Thai refinery (Example 10) demonstrate that filtration times resulting from 3:8 mixtures of P1 with P6 or 3:8 mixtures of P1 with P7 were in both cases shorter in comparison to a mixture consisting of C1 and C6. Example 11 repeats a dewaxing study carried out with a 300N feedstock of a refinery in South America. This example demonstrates that the principle illustrated here can be extended not only to additional feedstocks, but also to alternative solvent systems. Filtration experiments in methyl ethyl ketone/toluene show that a P1/P6 mixture leads to improved filtration times in comparison to a mixture of C1 and C6.

Example 12 carried out in n-heptane in the same 600N feedstock which was used in Example 9 shows that not only copolymers of styrene and behenyl acrylate, but also copolymers of other monomer types and behenyl acrylate are more effective than polybehenyl acrylates. Although it could be seen that the styrenic additive P1 led to the best results, the n-butyl methacrylate/behenyl acrylate copolymer was hardly any worse. Dewaxing studies using the benzyl methacrylate/behenyl acrylate copolymer P2 and also with the isononyl methacrylate/behenyl acrylate copolymer P5 were likewise distinctly more successful in comparison to results obtained with the behenyl acrylate polymer C1.

When preparing lubricants, the wash distillates from vacuum distillation of crude oil are initially freed of aromatics and heterocycles by solvent extraction. This improves the aging stability and the viscosity index. The raffinates still contain large amounts of paraffin wax and have correspondingly high pour points. Therefore, the majority of the paraffin is removed by solvent deparaffinization. To this end, the raffinate is admixed with a suitable solvent, for example methyl ethyl ketone-toluene and dichloroethane-dichloromethane mixtures or else propane. Then the mixture is cooled to temperatures of below −20° C. and the paraffin wax which has crystallized out is removed by a drum filter. Paraffin crystal platelets, as are formed without the addition of additives, block the filters and incorporate large amounts of oil (slack wax). As a consequence, the filtration rate in deparaffinization is often low and the oil yield is not optimum. Variation of the process parameters such as cooling rate, composition of the solvent mixture, filtration temperature and degree of dilution may be used to counteract these effects. However, process optimization can also be achieved by using polymeric dewaxing aids. Such dewaxing aids influence the size and shape of the paraffin crystals, so that compact structures are formed which form a filtercake which is porous and permeable to the solvent-oil mixture. Filtration rate and oil yield can be increased considerably in this way.

The literature discloses that in particular compact agglomerates of many small paraffin crystals which grow epitaxially, for example on vesicles of polyalkyl acrylates, form filtercakes of ideal texture and high porosity.

Polyalkyl methacrylates and polyalkyl acrylates which contain no other types of methacrylate or acrylate monomer are described in detail as dewaxing aids both in patents and in other literature. Both individual components and mixtures of different poly(meth)acrylate systems are illustrated as effective dewaxing aids.

IMPLEMENATION OF A LABORATORY FILTRATION TEST FOR DETERMINING THE FILTRATION RATE

In order to be able to carry out a selection of suitable polymers in the laboratory, a laboratory filtration apparatus has been developed which allows the measurement of oil yield and filtration rate. The filtration rate especially proved to be an important criterion for selecting suitable dewaxing aids. The filtration apparatus consists of a steel filter having a lid and cooling jacket and is cooled with the aid of a cryostat in circulation. The filter cloth used is from the deparaffinization plant of the refinery. The filter volume is 100 ml. The filter is connected via a glass attachment having a two-way tap to a measuring cylinder. A defined vacuum may be applied to the filtration apparatus by means of a rotary vane oil pump, a pressure-reducing valve and a manometer. The mineral oil distillate to be deparaffinized is admixed while hot, typically at 70° C., but in every case above the cloud point, with the deparaffinizing solvents and also the dewaxing aids and stirred until a clear solution results. The temperature control is then used to cool at a defined rate to the desired filtration temperature. The filter is precooled to this temperature.

All filtration conditions such as solvent:feedstock ratio, ratio of the solvents in the case of the use of solvent mixtures, cooling rates and filtration temperatures correspond to those conditions used in the particular refinery.

After the filtration temperature is obtained, the mixture is transferred to the precooled filter and the vacuum is applied. Operation is typically effected at a subatmospheric pressure of from 300 to 700 mbar. The filtration volume is then determined as a function of time. The filtration is over when no more liquid passes through the filter cloth.

The additives were used in the dewaxing experiments as polymer solutions in oil as prepared in the examples which follow. Alternatively, other solvent types may find use as support media of the dewaxing aids without any differences in effectiveness being detected thereby.

EXAMPLES

The behenyl acrylate used was obtained from Sidobre Sinova and used directly without further purification. A typical carbon number distribution in the behenyl radical is $C_{18}$ (40.0-46.0%), $C_{20}$(8.0-14.0%), $C_{22}$(42.0-48.0%). The source of the other methacrylate monomer types is specified in the preparation methods which follow. The viscosities are reported according to $\eta_{sp}/c$ ($CHCl_3$, 20° C.).

Example 1

Preparation of a Copolymer of Behenyl Acrylate and Styrene P1

In a three-necked flask equipped with a sabre stirrer and a reflux condenser, 306 g of behenyl acrylate (e.g. 45% behenyl acrylate from Sidobre Sinova), 34 g of styrene, 60 g of 100 N oil and 0.34 g of dodecylmercaptan are initially charged under a nitrogen protective gas atmosphere and heated to 80° C. 0.64 g of t-butyl perpivalate and 0.38 g of t-butyl perbenzoate are subsequently added, in order to initiate the polymerization. 2 hours after reaching the peak temperature, 0.68 g of t-butyl perbenzoate are added and polymerization is continued at 130° C. for 10-12 hours.
$M_w$ (GPC, PMMA calibration)=490,000 g/mol
$\eta_{sp}/c$ ($CHCl_3$, 20° C.)=50.7 ml/g
Thickening action (4.5% in a 150 N oil): 12.68 $mm^2$/s

Example 2

Preparation of a Copolymer of Behenyl Acrylate and Benzyl Methacrylate P2

In a three-necked flask equipped with a sabre stirrer and a reflux condenser, 306 g of behenyl acrylate (e.g. 45% behenyl acrylate from Sidobre Sinova), 34 g of benzyl methacrylate (manufacturer: Röhm GmbH & Co. KG, Darmstadt), 60 g of 100 N oil and 0.51 g of dodecylmercaptan are heated to 80° C. 0.64 g of t-butyl perpivalate and 0.38 g of t-butyl perbenzoate are subsequently added, in order to initiate the polymerization. 2 hours after reaching the peak temperature, 0.68 g of t-butyl perbenzoate are added and polymerization is continued at 130° C. for 10-12 hours.
$M_w$ (GPC, PMMA calibration)=645,000 g/mol
$\eta_{sp}/c$ ($CHCl_3$, 20° C.)=48.9 ml/g
Thickening action (4.5% by weight in a 150 N oil): 12.84 $mm^2$/s

Example 4

Preparation of a Copolymer of Behenyl Acrylate and n-Butyl Methacrylate P4

In a three-necked flask equipped with a sabre stirrer and a reflux condenser, 229.5 g of behenyl acrylate (e.g. 45% behenyl acrylate from Sidobre Sinova), 25.5 g of n-butyl methacrylate (manufacturer: Röhm), 45 g of 100 N oil and 0.255 g of dodecylmercaptan are heated to 80° C. 0.48 g of t-butyl perpivalate and 0.29 g of t-butyl perbenzoate are subsequently added, in order to initiate the polymerization. 2 hours after reaching the peak temperature, 0.60 g of t-butyl perbenzoate are added and polymerization is continued at 130° C. for 10-12 hours.
$M_w$ (GPC, PMMA calibration)=474,000 g/mol
$\eta_{sp}/c$ ($CHCl_3$, 20° C.)=52.1 ml/g
Thickening action (4.5% by weight in a 150 N oil): 13.09 $mm^2$/s

Example 5

Preparation of a Copolymer of Behenyl Acrylate and Isonoyl Methacrylate P5

In a three-necked flask equipped with a sabre stirrer and a reflux condenser, 229.5 g of behenyl acrylate (e.g. 45% behenyl acrylate from Sidobre Sinova), 25.5 g of isononyl methacrylate (e.g. the methacrylate of isononyl alcohol from Oxeno Olefinchemie GmbH, Marl prepared by means of transesterification starting from methyl methacrylate), 45 g of 100 N oil and 0.255 g of dodecylmercaptan are heated to 80° C. 0.48 g of t-butyl perpivalate and 0.29 g of t-butyl perbenzoate are subsequently added, in order to initiate the polymerization. 2 hours after reaching the peak temperature, 0.60 g of t-butyl perbenzoate are added and polymerization is continued at 130° C. for 10-12 hours.

$M_w$ (GPC, PMMA calibration)=503,000 g/mol $\eta_{sp}$/c (CHCl$_3$, 20° C.)=48.1 ml/g Thickening action (4.5% by weight in a 150 N oil): 13.12 mm$^2$/s

Example 6

Preparation of Poly(C$_{16-18}$-Alkyl Methacrylate) P6

In a three-necked flask equipped with a sabre stirrer and a reflux condenser, 5.0 g of 10 N oil are initially charged under a nitrogen protective gas atmosphere and heated to 120° C. A mixture of 113.6 g of C$_{16-18}$-alkyl methacrylate (e.g. the methacrylate of TA1618E alcohol from Procter & Gamble prepared by means of transesterification starting from methyl methacrylate), 17.4 g of 100 N oil, 0.56 g of t-butyl per-2-ethylhexanoate and 0.12 g of dodecylmercaptan are subsequently metered in within 60 minutes. After 0.5 hours, a further 0.75 g of t-butyl per-2-ethylhexanoate is added and polymerization is continued for 10-12 hours. After the end of the polymerization, the mixture is diluted with 264.0 g of 100 N oil.

Thickening action (15% by weight in a 150 N oil): 12.83 mm$^2$/s

Example 7

Preparation of a Poly(C$_{12-18}$-Alkyl Methacrylate) P7

In a polymerization vessel, 1350 kg of C$_{16-18}$-alkyl methacrylate (e.g. the methacrylate of the alcohol TA1618E from Procter & Gamble prepared by means of transesterification starting from methyl methacrylate), 3150 kg of C$_{12-14}$-alkyl methacrylate (e.g. the methacrylate of the alcohol Lorol Spezial from Cognis prepared by means of transesterification starting from methyl methacrylate), 1125 kg of 100 N oil and also 1.9 kg of dodecylmercaptan are initially charged and the mixture is heated to 120° C. A solution of 4 kg of t-butyl per-2-ethylhexanoate in 200 kg of 100 N oil is prepared and added to the monomer mixture in three successive metering steps. In the first step, initiator is added at a metering rate of 40 kg/h over 1 hour, and in the second step at a metering rate of 60 kg/h over a period of 40 minutes. 4.5 kg of t-butyl per-2-ethylhexanoate are dissolved in the remaining initiator solution and the resulting solution is added at a metering rate of 164 kg/h within 45 minutes. Polymerization is allowed to continue for approx. 1 hour.

Example 8

Preparation of Poly(C$_{12-18}$-Alkyl Methacrylate) P8

In a three-necked flask equipped with a sabre stirrer and reflux condenser, 17.8 g of C$_{12-18}$-alkyl methacrylate (e.g. based on a 78:22 mixture of the methacrylates of the alcohol Neodol 25E from Shell Chemicals and the alcohol TA1618E from Procter & Gamble, each prepared by means of transesterification starting from methyl methacrylate) and also 160 g of 100 N oil are initially charged under a nitrogen protective gas atmosphere and heated to 85° C. 1.8 g of t-butyl per-2-ethylhexanoate are then added, in order to initiate the polymerization. At the same time, metering in of a mixture of 622.2 g of C$_{12-18}$-alkyl methacrylate and 1.6 g of t-butyl per-2-ethylhexanoate is commenced and this is continued for 3.5 hours. After a further 2 hours, further polymerization is effected using 1.28 g of t-butyl per-2-ethylhexanoate at 85° C. for 10-12 hours. After the end of the polymerization, the mixture is diluted with 800 g of 100 N oil.

Thickening action (10% in a 150 N oil): 16.31 mm$^2$/s

Example 9

Filtration Volumes in ml from a Deparaffinization Study Using a 600N Feedstock of a European Refinery Using Novel Styrenic Copolymers Solvent system: n-heptane Feedstock: solvent ratio=1:2

Procedure 1) mixing at 70° C., 2) 30 min in a bath at 25° C., 3) 60 min in a bath at −30° C.

Filtration temperature: −30° C.

| Filtration time [s] | No additive | P6 (800 ppm) + P1 (300 ppm) | P6 (800 ppm) + C1 (300 ppm) | P7 (1370 ppm) + P1 (200 ppm) | P7 (1370 ppm) + C1 (200 ppm) | P8 (1230 ppm) + P1 (200 ppm) | P8 (1230 ppm) + C1 (200 ppm) |
|---|---|---|---|---|---|---|---|
| 0 | 0 | 0 | 0 | 0 | 0 | 0 | 0 |
| 10 | 1 | 7 | 3 | 9 | 6 | 5 | 2 |
| 20 | 2 | 9 |  | 14 | 8 | 9 | 3 |
| 30 | 2 | 10 | 8 | 17 | 11 | 10 | 4 |
| 40 | 3 | 11 | 9 | 19 | 13 | 12 | 5 |
| 50 | 3.5 | 12 | 9 | 21 | 14 | 13.5 | 6 |
| 60 | 4 | 13 | 9.5 | 23 | 15 | 14.5 | 7 |
| 70 | 5 | 14 | 10 | 24.5 | 17 | 15.5 | 8 |
| 80 | 5.5 | 15 | 10.5 | 26 | 18 | 16.5 | 9 |
| 90 | 6.5 | 16 | 11 | 27.5 | 19 | 17.5 | 9.5 |
| 100 | 7 | 16.5 | 11 | 28 | 20 | 18 | 10 |
| 120 | 8 | 18 | 12 | 30.5 | 22 | 20 | 10 |
| 140 | 8.5 | 19.5 | 12.5 | 33 | 23.5 | 21 | 11 |
| 160 | 9.5 | 21 | 13 | 36 | 25 | 22.5 | 11 |
| 180 | 10 | 22 | 14 | 37.5 | 27 | 23.5 | 12 |
| 200 | 10 | 23.5 | 15 | 39.5 | 28 | 25 | 12.5 |
| 240 | 11 | 25 | 16 | 42.5 | 30 | 27 | 13 |

-continued

| Filtration time [s] | No additive | P6 (800 ppm) + P1 (300 ppm) | P6 (800 ppm) + C1 (300 ppm) | P7 (1370 ppm) + P1 (200 ppm) | P7 (1370 ppm) + C1 (200 ppm) | P8 (1230 ppm) + P1 (200 ppm) | P8 (1230 ppm) + C1 (200 ppm) |
|---|---|---|---|---|---|---|---|
| 300 | 12 | 28.5 | 18 | 47.5 | 34 | 30 | 15 |
| 600 | 16 | 39 | 24.5 | 69.5 | 47 | 41 | 20 |

Example 10

Filtration Volumes in ml from a Deparaffinization Study Using a 500N Feedstock of a Thai Refinery Solvent system: n-heptane
Feedstock: solvent ratio=1:2
Procedure: 1) mixing at 70° C., 2) 30 min in a bath at 25° C., 3) 90 min in a bath at −30° C.
Filtration temperature: −30° C.

| Filtration time [s] | No additive | P6 (800 ppm) + P1 (300 ppm) | P7 (1370 ppm) + P1 (200 ppm) | P6 (800 ppm) + C1 (300 ppm) |
|---|---|---|---|---|
| 0 | 0 | 0 | 0 | 0 |
| 100 | 8.5 | 18 | 19 | 16 |
| 200 | 11 | 24.5 | 27 | 22 |
| 300 | 12.5 | 30 | 32 | 26.5 |
| 420 | 14 | 35 | 38 | 31 |
| 480 | 15 | 38 | 40 | 33 |
| 600 | 16.5 | 42 | 45 | 37 |
| 720 | 17.5 | 46 | 49 | 40 |
| 840 | 18.5 | 50 | 53 | 42.5 |
| 900 | 19.5 | 52.5 | 55 | 44 |

Example 11

Filtration Volumes in ml from a Deparaffinization Study Using a 300N Feedstock from a Refinery in South America Solvent system: 55% of methyl ethyl ketone/45% of toluene
Feedstock: solvent ratio=1:3
Procedure: 1) mixing at 70° C., 2) 30 min in a bath at 25° C., 3) 60 min in a bath at −18° C.
Filtration temperature: −18° C.

| Filtration time [s] | No additive | P6 (800 ppm) + P1 (150 ppm) | P6 (800 ppm) + C1 (400 ppm) |
|---|---|---|---|
| 0 | 0 | 0 | 0 |
| 50 | 17 | 38 | 31 |
| 100 | 24 | 55 | 45 |
| 150 | 29 | 68 | 56 |

Example 12

Filtration Volumes in ml from a Deparaffinization Study Using a 600N Feedstock from a European Refinery with Novel Copolymers Solvent system: n-heptane
Feedstock: solvent ratio=1:2
Procedure: 1) mixing at 70° C., 2) 30 min in a bath at 25° C., 3) 60 min in a bath at −30° C.
Filtration temperature: −30° C.

| Filtration time [s] | No additive | C1 (300 ppm) | P1 (300 ppm) | P2 (300 ppm) | P4 (300 ppm) | P5 (300 ppm) |
|---|---|---|---|---|---|---|
| 0 | 0 | 0 | 0 | 0 | 0 | 0 |
| 10 | 1 | 1 | 3 | 1 | 3.5 | 2 |
| 20 | 2 | 1 | 4.5 | 2 | 4.5 | 3.5 |
| 30 | 2 | 1.5 | 5.5 | 2.5 | 5.5 | 5 |
| 40 | 3 | 2 | 6.5 | 3.5 | 6.5 | 6 |
| 50 | 3.5 | 2.5 | 8 | 4.5 | 7.5 | 7 |
| 60 | 4 | 3 | 9 | 6 | 8.5 | 8 |
| 70 | 5 | 3.5 | 9 | 7 | 9.5 | 8.5 |
| 80 | 5.5 | 4 | 10 | 8 | 10 | 9 |
| 90 | 6.5 | 4.5 | 10.5 | 8.5 | 10 | 9.5 |
| 100 | 7 | 5 | 11 | 8.5 | 10 | 9.5 |
| 120 | 8 | 5.5 | 12 | 9.5 | 11 | 10 |
| 140 | 8.5 | 6 | 13 | 10 | 11.5 | 10 |
| 160 | 9.5 | 6.5 | 14 | 10 | 12 | 11 |
| 180 | 10 | 7 | 14.5 | 10.5 | 13 | 11.5 |
| 200 | 10 | 7.5 | 15 | 11 | 14 | 12 |
| 240 | 11 | 8 | 17 | 12 | 15 | 13 |
| 300 | 12 | 9 | 18.5 | 13 | 16.5 | 14 |
| 600 | 16 | 12 | 26 | 18 | 23 | 19.5 |

Comparative Example

Preparation of a Polybehenyl Acrylate C1

In a three-necked flask equipped with a sabre stirrer and a reflux condenser, 255 g of behenyl acrylate (e.g. based on 45% behenyl acrylate from Sidobre Sinova), 45 g of 100 N oil and 0.13 g of dodecylmercaptan are initially charged under a nitrogen protective gas atmosphere and heated to 80° C. 0.41 g of t-butyl perpivalate and 0.25 g of t-butyl perbenzoate are subsequently added, in order to initiate the polymerization. 2 hours after reaching the peak temperature, 0.51 g of t-butyl perbenzoate are added, after which polymerization is continued at 130° C. for 10-12 hours.

$\eta_{sp}/c$ (CHCl$_3$, 20° C.)=42 ml/g

Thickening action (4.5% by weight in a 150 N oil): 12.19 mm$^2$/s

The invention claimed is:

1. A method for solvent deparaffinization of paraffinic mineral oil distillates, comprising:
   adding a dewaxing additive and a solvent to said paraffinic mineral oil distillates, to obtain a solvent-paraffinic mineral oil mixture;
   stirring until a clear solution results;
   cooling the solution to below −20° C. at a defined rate, thereby forming paraffin crystals which form a filter cake which is porous and permeable to the solution; and
   separating said paraffin crystals from said solution by filtration;

increasing a filtration volume per filtration time compared to the filtration volume per filtration time using no dewaxing additive; and obtaining deparaffinized mineral oil distillates;

wherein said dewaxing additive comprises a copolymer of the following free-radically polymerizable monomers of Formulae A and B:

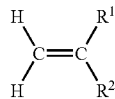

Formula A wherein
$R^1$=H or $CH_3$,
$R^2$=phenyl, benzyl, naphthyl, anthranyl, phenanthryl, N-pyrrolidonyl, N-imidazolyl, 2-pyridyl, 4-pyridyl or an alkyl-substituted aromatic substituent or
$R^2$=COOR$^3$ where $R^3$=H or $R^3$ is a linear or branched alkyl radical of $C_1$-$C_{10}$
or
$R^3$ is a heteroatom-substituted radical —$(CH_2)_n$X where X=OH or X=N$(R^4)_2$ wherein n=1-10 and $R^4$ is in each case independently H or $R^4$=$C_1$-$C_4$-alkyl
or
$R^3$ is —$(CH_2CH_2O)_m R^5$ wherein m=1-90 and $R^5$=H or $R^5$=$C_1$-$C_{18}$ or $R^3$ is a benzyl, phenyl or cyclohexyl radical
or
$R^2$=CONHR$^6$ wherein $R^6$=H or $R^6$ is a linear or branched alkyl radical of $C_1$-$C_{10}$
or
$R^6$ is a heteroatom-substituted radical —$(CH_2)_n$X where X=OH or X=N$(R^4)_2$ wherein n=1-10 and $R^4$ is in each case independently H or $R^4$=$C_1$-$C_4$-alkyl;

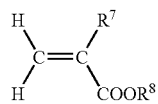

Formula B wherein $R^7$=H or $CH_3$, and
$R^8$ radical=linear or branched alkyl radicals of $C_{12}$-$C_{40}$, and,
optionally further customary dewaxing additives.

2. The method according to claim 1, wherein the addition rate of the copolymer is 0.005-0.5%.

3. The method according to claim 1, wherein said paraffin crystals grow epitaxially.

4. The method according to claim 1, comprising:
adding said dewaxing additive to said paraffinic mineral oil distillates at a temperature above the cloud point of said mineral oil.

5. The method according to claim 1, wherein the proportion by weight of the monomer A in the total weight of the copolymer is 0.1-70%.

6. The method according to claim 1, wherein at least 50% of the monomers B contain alkyl radicals $R^8$ of chain length greater than or equal to $C_{16}$.

7. The method according to claim 1, wherein the monomers of formula A consist of one or more monomers selected from the group consisting of styrene, butyl methacrylate, methyl methacrylate, 2-ethylhexyl methacrylate and mixtures thereof.

8. The method according to claim 1, said dewaxing additive further comprising one or more homo- or copolymers which are polyalkyl methacrylates and have alkyl substituents of chain length C1-C24.

9. The method according to claim 8, wherein the homo- or copolymers which are polyalkyl methacrylates have alkyl substituents of chain length $C_{12}$-$C_{18}$.

10. The method according to claim 8, wherein a ratio of the copolymers and the homo- or copolymers which are polyalkyl methacrylates is 1:20 to 20:1.

11. The method according to claim 8, wherein the homo- or copolymer is a polyalkyl methacrylate which contains up to 20% by weight of $C_1$-$C_{10}$ methacrylates.

12. The method according to claim 1, wherein the dewaxing additive is a solution of the copolymer in an oil of the paraffinic or naphthenic type, or in an organic solvent.

13. The method according to claim 12, wherein the organic solvent is selected from the group consisting of toluene, methyl-ethyl-ketone, xylene, naphtha and mixtures thereof or wherein the organic solvent is propane.

14. The method according to claim 1, wherein the dewaxing additive comprises
a copolymer of behenyl acrylate and styrene.

15. The method according to claim 1, wherein the dewaxing additive comprises
a copolymer of behenyl acrylate and at least one member selected from the group consisting of n-butyl methacrylate, isononyl methacrylate, and benzyl methacrylate.

16. The method according to claim 1, wherein the dewaxing additive consists of:
a copolymer of behenyl acrylate and styrene.

17. The method according to claim 1, in which the obtained deparaffinized mineral oil distillates show an increased degree of dewaxing compared to a method in which a styrene-free dewaxing aid is used.

18. The method according to claim 1, wherein said filtration volume per filtration time is increased by at least 10% compared to the filtration volume per filtration time using no dewaxing additive.

19. The method according to claim 1, wherein said filtration volume per filtration time is increased by at least 20% compared to the filtration volume per filtration time using no dewaxing additive.

20. The method according to claim 1, wherein said filtration volume per filtration time is increased by at least 30% compared to the filtration volume per filtration time using no dewaxing additive.

* * * * *